United States Patent [19]
Mayse

[11] Patent Number: 4,714,219
[45] Date of Patent: Dec. 22, 1987

[54] CHRISTMAS LIGHT HANGERS

[76] Inventor: Noble R. Mayse, P.O. Box 5973, Concord, Calif. 94524

[21] Appl. No.: 1,411

[22] Filed: Jan. 8, 1987

[51] Int. Cl.[4] .............................................. F16L 3/08
[52] U.S. Cl. ...................................... 248/65; 362/249
[58] Field of Search .................. 248/65, 74.1; 256/53, 256/2; 174/163 F, 163 R, 158 F; 362/388, 430, 806, 145, 147, 152, 249, 252, 432

[56] References Cited

U.S. PATENT DOCUMENTS

| 599,346 | 2/1898 | McCoy | 248/65 |
| 768,598 | 8/1904 | Gladhill | 256/53 X |
| 3,883,926 | 5/1975 | Reynolds | 248/74.1 |
| 4,335,422 | 6/1982 | Ess | 362/388 |
| 4,357,653 | 11/1982 | Kovacs | 362/388 |
| 4,404,621 | 9/1983 | Mavro | 362/249 X |
| 4,471,415 | 9/1984 | Larson et al. | 362/389 X |
| 4,491,902 | 1/1985 | Cangelosi | 362/249 X |

FOREIGN PATENT DOCUMENTS

| 3047973 | 10/1981 | Fed. Rep. of Germany | 248/74 R |
| 1194237 | 11/1949 | France | 174/163 F |

Primary Examiner—J. Franklin Foss
Attorney, Agent, or Firm—Gilden & Israel

[57] ABSTRACT

Brackets for holding strings of Christmas lights are of an L-shaped design and are selectively attachable to stationery structures. A first leg of each bracket is attachable to the stationary structure through the use of threaded fasteners, or the like, and the second leg includes an L-shaped slot through which a light string is positioned. A sleeve slidable upon the second leg can then be pushed over the slot opening to fixedly secure the light string to the bracket.

5 Claims, 5 Drawing Figures

CHRISTMAS LIGHT HANGERS

BACKGROUND OF THE INVENTION

1. Field of the Invention

The present invention relates to Christmas light holders, and more particularly pertains to a new and improved Christmas light holding bracket which includes a slot for receiving a Christmas light string and which further includes a locking sleeve to fixedly secure the string to the bracket once it has been positioned within the slot.

2. Description of the Prior Art

The use of frame structures and brackets for holding Christmas light strings is known in the prior art. In this respect, reference is made to U.S. Pat. No. 4,357,653, which issued to M. Kovacs on Nov. 2, 1982. The Kovacs light holding structure essentially comprises an adjustable four sided frame assembled of a plurality of channel members and having notched flanges running along opposite sides thereof for holding tinsel foil wrapping. Additionally, an inner side flange is provided with slotted apertures for holding Christmas light bulbs. While the Kovacs light frame is functional for its intended purpose, it can be appreciated that it is of a substantially complex design requiring special manufacturing techniques, and is further substantially large and cumbersome to use. Due to its large size, the Kovacs light frame would normally be quite visible, which is most likely the reason that the inventor included slots for receiving tinsel foil wrapping, and further, this light frame assembly would have to be removed from its supporting structure after the Christmas season due to such high visibility. As such, there appears to be a continuing need for new and improved Christmas light holding frames and brackets which could be easily and inexpensively manufactured and which would be small enough to remain attached to a static structure on a continual all year basis due to low visibility features. In this respect, the present invention substantially fulfills this need.

SUMMARY OF THE INVENTION

In view of the foregoing disadvantages inherent in the known types of Christmas light holders now present in the prior art, the present invention provides an improved Christmas light holding construction wherein the same can be permanently mounted to a static structure so as to allow Christmas light strings to be attached to and removed therefrom when desired. As such, the general purpose of the present invention, which will be described subsequently in greater detail, is to provide a new and improved Christmas light holder which has all the advantages of the prior art Christmas light holders and none of the disadvantages.

To attain this, the present invention essentially comprises an L-shaped bracket having first and second legs. The first leg is attachable to a static structure through the use of threaded fasteners or the like, and the second leg includes an L-shaped slot for receiving a Christmas light string. Once a Christmas light string is positioned within the slot, a slidable sleeve movable along the second leg can be moved into abutment with the string. When so positioned, the slidable sleeve closes the light string holding slot so that the string cannot become disengaged from the second leg. Each bracket may further include small upstanding detents to prevent a slidable disengagement of the sleeve from the second leg when it is not being utilized to hold a Christmas tree light string.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved Christmas light string holders which have all the advantages of the prior art Christmas light string holders and none of the disadvantages.

It is another object of the present invention to provide new and improved Christmas light string holders which may be easily and efficiently manufactured and marketed.

It is a further object of the present invention to provide new and improved Christmas light string holders which are of a durable and reliable construction.

An even further object of the present invention is to provide a new and improved Christmas light string holder which is susceptible of a low cost of manufacture with regard to both materials and labor, and which accordingly is then susceptible of low prices of sale to the consuming public, thereby making such Christmas light string holders economically available to the buying public.

Still yet another object of the present invention is to provide a new and improved Christmas light string holder which provides in the apparatuses and methods of the prior art some of the advantages thereof, while simultaneously overcoming some of the disadvantages normally associated therewith.

Still another object of the present invention is to provide a new and improved Christmas light string holder which may be permanently mounted to a static structure on a continual all year basis.

Yet another object of the present invention is to provide a new and improved Christmas light string holder which permits a rapid fixed attachment of a Christmas light string thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
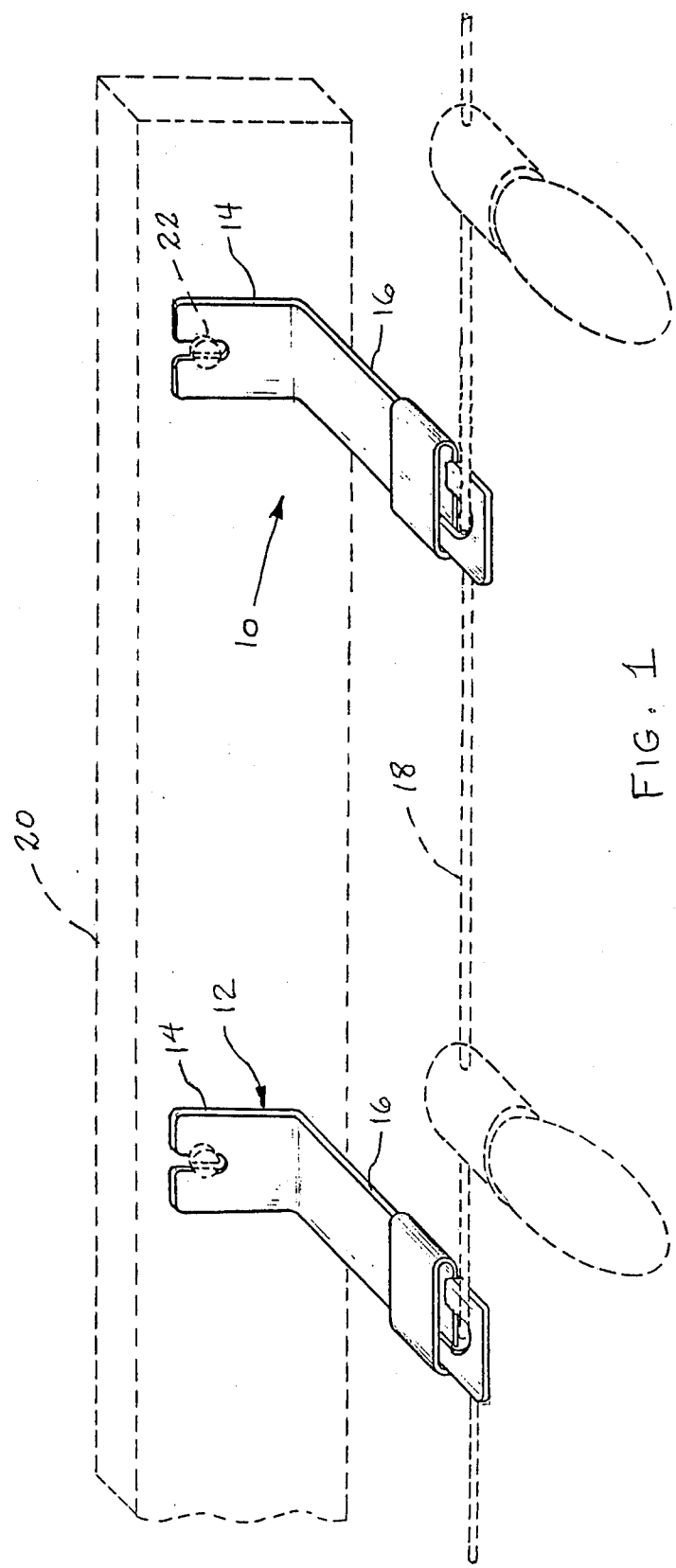
FIG. 1 is a perspective view of the Christmas light holders comprising the present invention showing the same in operable engagement with a Christmas light string.

With reference now to the drawings, and in particular to FIG. 1 thereof, a new and improved Christmas light string holding bracket embodying the principles and concepts of the present invention and generally designated by the reference numeral 10 will be described.

More specifically, it will be noted that the Christmas light holding assembly comprising the present invention essentially includes the use of a plurality of L-shaped brackets 12, each of which includes a first leg 14 and a second 16 integrally attached to the first leg. The brackets 12 can be manufactured from any strong and rigid material, such as metal, plastic, or the like, which would possess sufficient strength to support a string 18 of Christmas tree lights as illustrated in FIG. 1. The brackets 12 are designed to have their first legs 14 fixedly secured to a static structure 20, such as the eaves of a house, with such attachment of the brackets to the structure being accomplished through the use of threaded fasteners 22 or the like.

Figure 2:
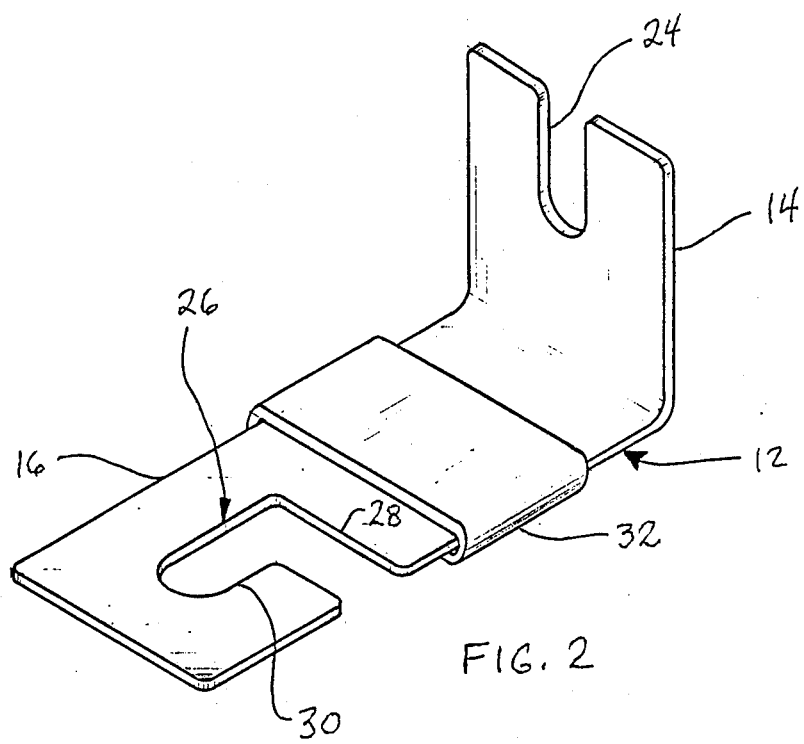
FIG. 2 is a perspective view of a first embodiment of the invention.

With reference to FIG. 2 of the drawings in conjunction with FIG. 1, a first embodiment of the bracket 12 will be more particularly described. In this regard, it can be seen that the first leg 14 of a bracket 12 may be provided with a slot 24 into which a threaded fastener 22 may be positioned when attaching the bracket to a static structure 20. Additionally, the second leg 16 of the bracket 12 is provided with an L-shaped slot 26. The slot 26 includes a first slot portion 28 and a second slot portion 30 which is orthogonally aligned with the first slot portion. A slidable sleeve 32 is positioned over the second leg 16 and may be formed of some flexible or semirigid material, such as plastic or the like. The sleeve 32 may be slid along the leg 16 to fixedly secure a light string 18 in position relative thereto in a manner which will be subsequently described in greater detail.

Figure 3:
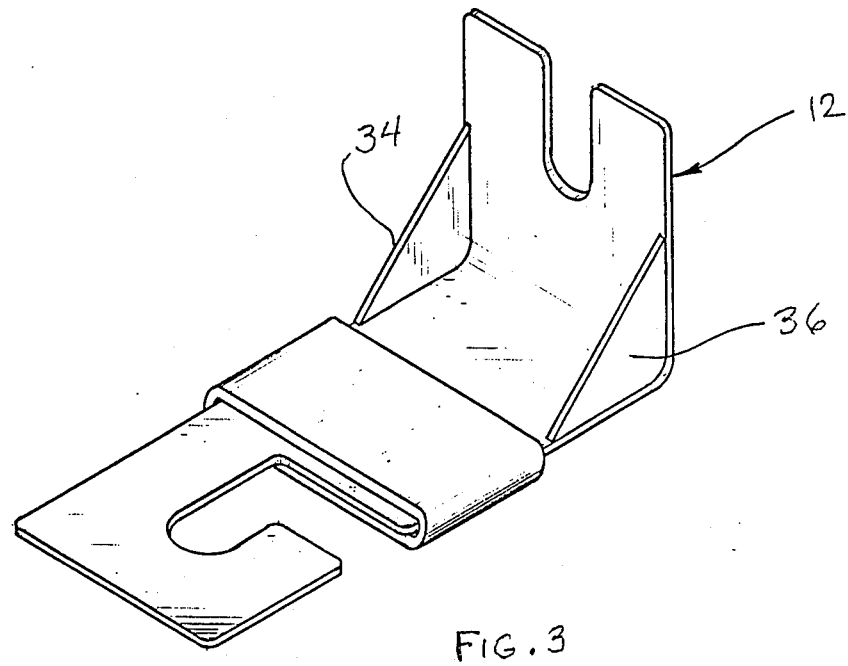
FIG. 3 is a perspective view of a second embodiment of the invention.

FIG. 3 of the drawings illustrates a second embodiment of the invention wherein the construction of the bracket 12 has been modified to include the use of side stiffeners 34, 36. The use of such stiffeners 34, 36 provides for a small saving in raw material inasmuch as the thickness of the material used in the construction of the bracket 12 can be reduced when the stiffeners are utilized. All other features of this second embodiment of the invention are the same as those in the first embodiment.

Figure 4:
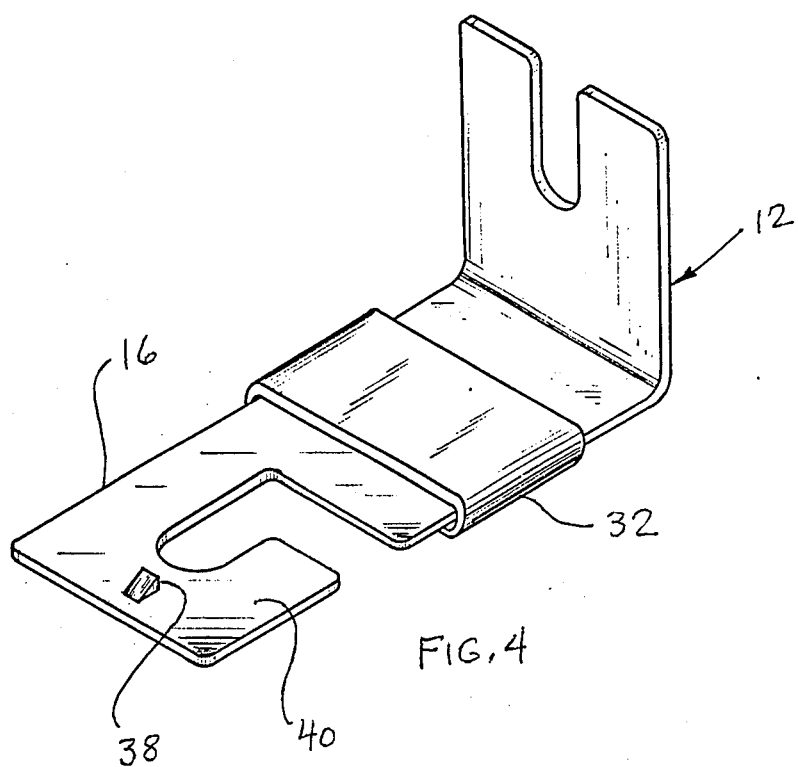
FIG. 4 is a perspective view of third embodiment of the invention.

FIG. 4 of the drawings illustrates a further modified embodiment of the invention 10. In this respect, it can be appreciated that during periods of nonuse, the sleeve 32 could become slidably disengaged from the second leg 16. As such, a small upstanding detent 38 can be formed in a planar surface 40 of the second leg, and this detents limits the forward movement of the sleeve 32 along the leg 16 to the extent that it cannot become disengaged therefrom.

Figure 5:
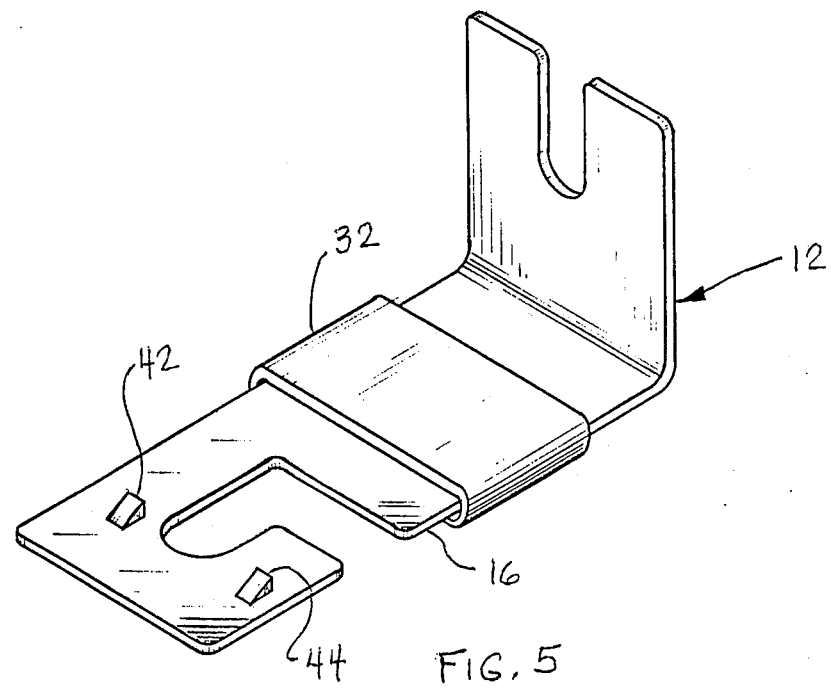
FIG. 5 is a perspective view of a fourth embodiment of the invention.

FIG. 5 of the drawings illustrates a further modified embodiment of the invention which is substantially similar to the embodiment shown in FIG. 4. In this respect, the upstanding detent 38 as illustrated in FIG. 4 has been replaced by a pair of upstanding detents 42, 44 which operate to prevent the slidable disengagement of the sleeve 32 from the leg 16.

With respect to the manner of usage and operation of the present invention 10, it can be appreciated that a plurality of the brackets 12 may be affixed to a static structure 20 through the use of threaded fasteners 22. The brackets 12 are designed to remain attached to the static structure 20 on a continual all year basis due to their small size and low visibility. When attaching a string 18 of Christmas tree lights thereto, it can be appreciated that the string may be directed initially through the slot 28 and then be finally positioned within the slot 30. The sleeve 32 is then be moved forwardly along the second leg 16 so as to abut against the light string 18 while also serving to close off the slot 28. As such, a disengagement of the light string 18 from the bracket 12 is prevented. When it is desired to remove the light string 18 from each bracket 12, the sleeve 32 only needs to be slid backwardly along the leg 16, thereby to once again open the slot 28.

With respect to the above description then, it is to be realized that the optimum dimensional relationships for the parts of the invention, to include variations in size, materials, shape, form, function and manner of operation, assembly and use, are deemed readily apparent and obvious to one skilled in the arts, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A christmas light string holder, comprising:
   a. bracket means having first and second legs, said bracket means having a substantially L-shaped design;
   b. first slot means formed in said first leg, said first slot means facilitating an attachment of said first leg to a static structure through a use of a fastener;
   c. second slot means formed in said second leg, said second slot means serving to receive said Christmas light string so as to effect a securement thereof to said holder, said second slot means including a first slot portion formed in said second leg and a second slot portion in communication with said first slot portion and being substantially orthogonally directed relative thereto; and, d. locking means for fixedly holding said Christmas light string in said second slot means, said locking means comprising a slidable sleeve movable along said second leg.

2. The Christmas light string holder as described in claim 1, wherein said slidable sleeve is postionable over said first slot portion to effect a fixed holding of said Christmas light string in said second slot portion.

3. The Christmas light string holder as described in claim 1, and further including sleeve retention means for preventing a disengagement of said slidable sleeve from said second leg.

4. The Christmas light string holder of claim 3, wherein said sleeve retention means is formed on said second leg.

5. The Christmas light string holder as described in claim 4, wherein said sleeve retention means comprises at least one upstanding detent abuttable with said slidable sleeve.

* * * * *